June 13, 1939.　　P. A. SKINNER　　2,162,181
SUPPORTING STRUT
Filed June 16, 1938　　2 Sheets-Sheet 1
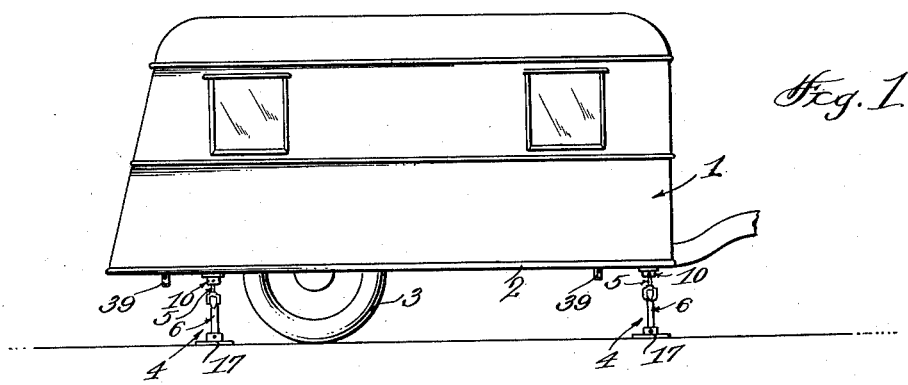
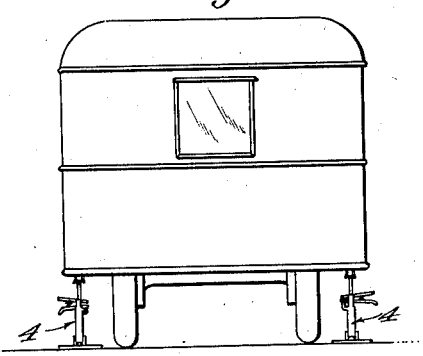 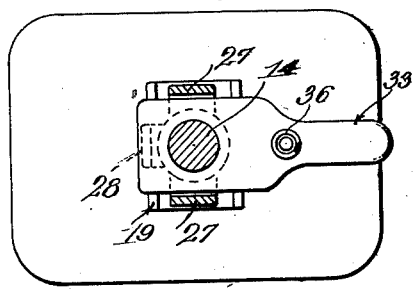
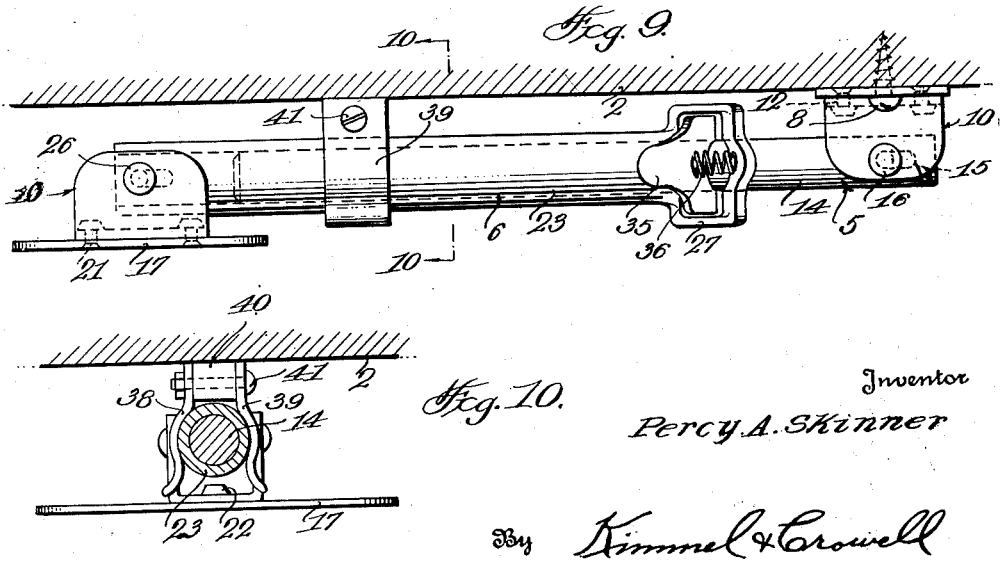
Inventor
Percy A. Skinner
By Kimmel & Crowell
Attorneys

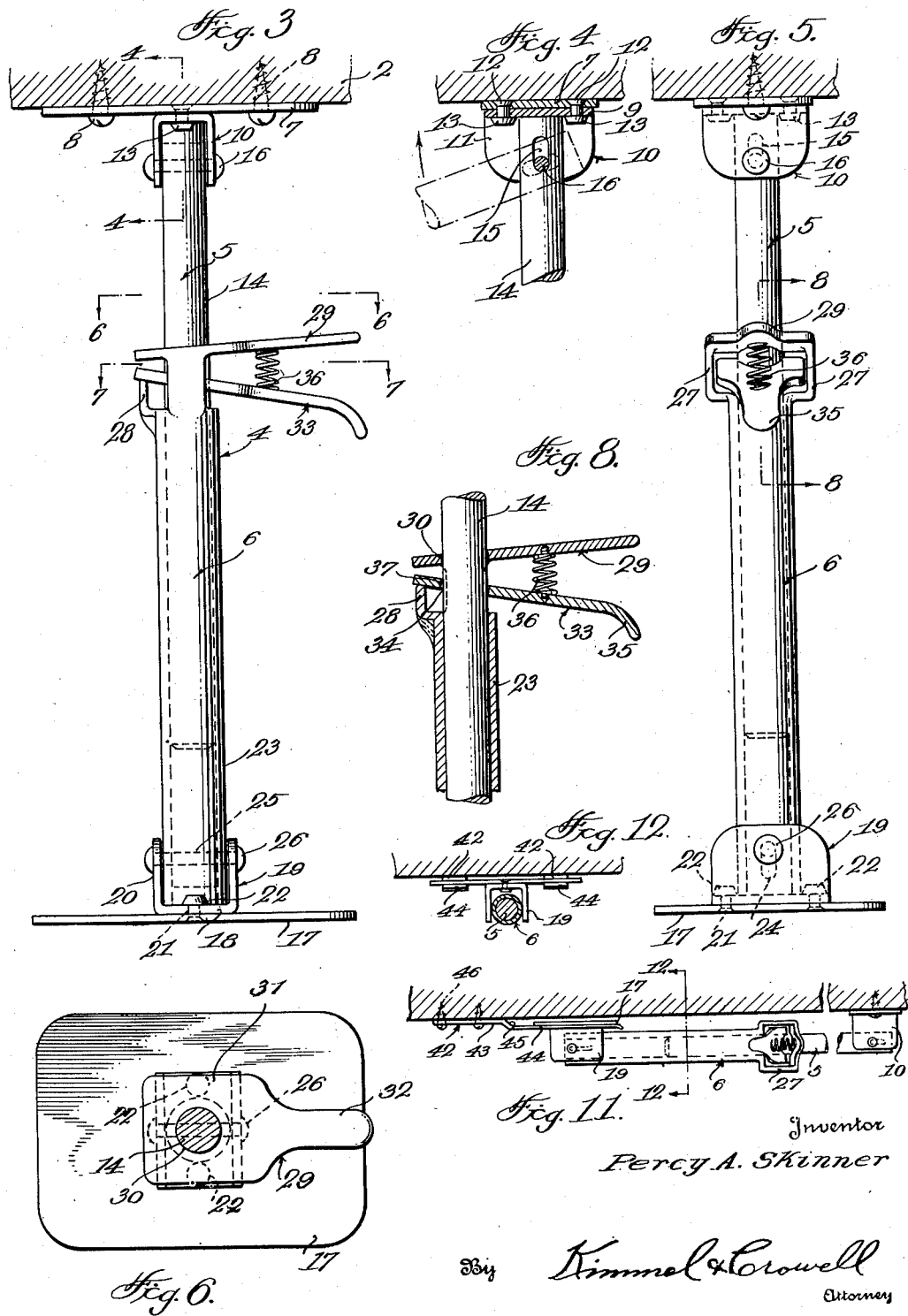

Patented June 13, 1939

2,162,181

UNITED STATES PATENT OFFICE 2,162,181

SUPPORTING STRUT

Percy A. Skinner, Ionia, Mich.

Application June 16, 1938, Serial No. 214,126

5 Claims. (Cl. 248—354)

This invention relates to a new and improved supporting strut designed primarily as a part of the equipment for a house trailer, but it is to be understood that a strut in accordance with this invention is for use in any connection for which it may be found applicable.

The invention has for its object to provide, in a manner as hereinafter set forth, a foldable and extendable supporting strut adapted to be attached to the bottom of the trailer and whereby when a set of three or four struts are carried by the trailer the struts are capable of being extended and positioned for supporting the trailer when the latter is stationary for housekeeping use; for removing tension from off the springs of the trailer when the latter is stationary and used for housekeeping; for making the floor of the trailer rigid when the latter is employed for the purpose aforesaid; and to prevent the usual swaying and teetering of the trailer due to persons walking inside of the latter when the trailer is supported by the struts and employed for housekeeping.

Further objects of the invention are to provide in a manner as hereinafter set forth, a strut of the class referred to which is simple in its construction and arrangement, strong, durable, compact, adjustable, readily assembled, quickly installed with respect to a trailer, conveniently moved to and from trailer supporting position, and inexpensive to manufacture.

To the above ends essentially and to others which may hereinafter appear, the invention consists of the novel construction, combination and arrangement of parts as will be more specifically referred to and illustrated in the accompanying drawings wherein is shown an embodiment of the invention, but it is to be understood that changes, variations and modifications may be resorted to which fall within the scope of the invention as claimed.

In the drawings:

Figure 1 is a side elevation of a house trailer showing supporting struts, in accordance with this invention connected to the bottom thereof, Figure 2 is an end elevation of a house trailer showing supporting struts in accordance with this invention attached thereto, Figure 3 is an elevation of the strut when extended, Figure 4 is a section on line 4—4, Figure 3, Figure 5 is an elevation of the strut when extended looking at right angles to the showing of Figure 3, Figure 6 is a section on line 6—6, Figure 3, Figure 7 is a section on line 7—7, Figure 3, Figure 8 is a fragmentary sectional view on line 8—8, Figure 5, Figure 9 is a front elevation with the strut folded, Figure 10 is a section on line 10—10, Figure 9, Figure 11 is a side elevation, broken away illustrating a modified form of means for releasably securing the strut folded in inactive position, and Figure 12 is a section on line 12—12, Figure 11.

With reference to the drawings, 1 generally indicates a housing trailer provided with a bottom or floor 2. The wheels of trailer 1 are indicated at 3.

A supporting strut, in accordance with this invention is generally indicated at 4 and includes an upper section 5 and a lower section 6 into which the section 5 telescopes.

The section 5 consists of a head plate 7 which is adapted to be anchored to the lower face of the bottom or floor 2 of the trailer. Holdfast means 8 are employed for anchoring plate 7 to the bottom 2 of the trailer. Fixed to a plate 7 on its transverse center is the base 9 of an inverted U-shaped member 10. The sides of member 10 are indicated at 11. The base 9 is fixed to plate 7 by a pair of spaced horizontally aligned rivets 12 having their lower ends upset as at 13 to provide stops. The section 5 includes a supporting post 14 which, when in supporting position, abuts the lower face of base 9 and has its upper end arranged between the heads 13. Post 14 in proximity to its upper end is formed with a diametrically disposed slot 15 and extending through the latter is a pin 16 carried by the sides 11 of the member 10. The latter and the plate 7 provide what may be termed a head structure. The slot 15 in connection with the pin 16 pivotally and slidably connects post 14 to the member 10.

The section 6 includes a foot piece 17, to the upper face of which is fixedly secured thereon the base 18 of a U-shaped member 19 having its sides indicated at 20. The base 18 of member 19 is anchored to the foot piece 17 by a pair of spaced horizontally aligned rivets 21 having their upper ends upset as at 22 to provide stops for a purpose to be referred to. The members 10 and 19 are of like form but member 10 is inverted with respect to the position of the member 19. The latter and the foot-piece 17 constitutes what may be termed a foot-structure. Extending into the member 19 and abutting the upper face of the base 18 is a tubular standard 23 formed in proximity to its lower end with a pair of diametrically opposed slots 24 through which extends a pin 25. The latter also extends through the sides 20 of member 19 and has its ends upset as at 26. The slot 24 in connection with the pin 25 pivotally and slidably connects the standard 23 to the member 19. When the standard 23 is in the position shown in Figures 3 and 5, and which is its active position, the lower end of the standard is arranged between the heads 22 and these heads act to prevent the shifting of standard 23 relative to member 19. The post 14 telescopes the standard 23 and is of the length desired. The post 14 is capable of being adjusted lengthwise of the standard 23 and after adjustment is clamped in adjusted position by a means to be referred to and which is carried by the upper end of the standard 23.

The upper end of standard 23 is formed with a pair of diametrically opposed offset arms 27 and also with an upstanding offset arm 28 which is arranged between and equally spaced from the arms 27. Formed integral with the top of the arms 27 is a stationary grip 29 provided with an opening 30 through which passes the post 14. The grip 29 consists of a wide part 31 and a narrow handle part 32. The opening 30 is formed centrally of the part 31. The grip 29 slightly extends at an upward inclination with respect to the horizontal. Arranged between the arms 27 and engaging with the top of the arm 28 is a spring controlled clamping member 33. The arm 28 forms a fulcrum for the member 33 and the latter is formed with an opening 34 substantially in alignment with the opening 30. The member 33 is also provided with a hand grip part 35. Fixed to the grip 29 and to the member 33, as well as being interposed therebetween is a coiled controlling spring 36. The spring 36 normally maintains the member 33 in clamping engagement relative to post 14, and in this connection attention is directed to Figure 8. The wall of opening 37 constitutes a gripping means for engaging the post 14 as is shown in Figure 8, to arrest the lowering movement of the post 14 when the strut is in the position shown in Figures 3 and 5.

The strut is capable of being contracted and extended and further capable of being folded to a parallel position with respect to the bottom or floor 2 of the trailer and in this connection attention is directed to Figure 9. When the strut is in the position shown in Figure 9 the post 14 is extended into the standard 23 to a point near the member 19. The strut is releasably secured in the position shown in Figure 9 by a pair of oppositely disposed spring clamps 38, 39 secured to opposite sides of a hanger 40 by a holdfast means 41. The hanger is secured and depends from the bottom or floor 2 of the trailer. The springs 38, 39, when the strut is in the position shown in Figure 9, frictionally engage with opposite sides of the standard 23 and releasably secure the post 14 and standard 23 in parallel spaced relation to the bottom of the trailer.

The upset ends 13 of the holdfast means 12, as aforesaid, constitute stops which function to arrest the shifting movement of the post 14 when the latter is in supporting position. When in supporting position the post 14 abuts the lower face of the base 9 of the member 10 and is arranged between the stops 13. Under such conditions the post 14 is prevented from shifting on its pivot with respect to the member 10.

When the struts are employed in connection with the trailer, a set of four is used, one strut being arranged in proximity to a corner of the bottom or floor 2 of the trailer. When the struts are in inactive position the post 14 and standard 23 are moved to a parallel spaced position with respect to the bottom or floor 2. Each post and its associated standard is folded rearwardly to the position shown in Figure 9 for the purpose of the standard engaging the clamps 38, 39. Each pair of clamps is arranged rearwardly of the head plate 7. When the strut is folded, the foot piece 17 is suspended from the rear end of the standard and in this connection attention is directed to Figure 9. When the strut is to be used it is shifted to the position shown in Figures 3 and 4 with the clamping member 33 in inactive position, and extended so that the foot piece 17 will seat on the ground. When the foot piece 17 has been seated, the clamping member is released whereby the spring 36 will act to shift member 33 to the position shown in Figure 8 whereby post 14 will be clamped from movement. When it is desired to shift the strut from active to inactive position the clamping member 33 is released to enable the lowering of the post 14 and which will permit the latter to be moved to the dotted line position shown in Figure 4. The slot 15 permits of the post 14 being lowered relative to the standard 23 when the strut is in the position shown in Figures 3 and 5. After the post has been lowered it is swung on its pivot to the position shown in Figure 9 and which carries the standard 23 therewith. Standard 23 is subsequently engaged with the clamps 38, 39 such as shown in Figure 9 whereby the strut will be held in inactive position. As the standard 23 moves to the position shown in Figure 9, the member 19 will swing on pin 25 and assume the position shown in Figure 9 whereby the foot piece 17 will be suspended from standard 23.

With reference to Figures 11 and 12 a modified form of means for releasably securing the strut folded in inactive position is shown. The said means consists of a pair of spaced sidewise parallel securers 42 in the form of metallic straps of like form disposed in lengthwise relation to the bottom or floor of the trailer and spaced the desired distance from and aligned with the member 10. Each securer consists of a pair of end portions 43, 44 disposed in parallel planes connected together by a depending inclined intermediate portion 45 which disposes portion 43 above portion 44. When the strut is folded to inactive position the foot piece 17 is slid onto and releasably supported by the portions 44 of the securers and with the member 19 relative to and arranged between the said portions 44. Each portion 43 is secured against the lower face of the bottom of the trailer by the holdfast means 46 between the said portions 44.

What I claim is:

1. In a lengthwise adjustable supporting strut for trailer bodies, a head structure adapted to be fixed to the trailer body, a foot structure for mounting on the ground, a supporting post, a slidable hinged connection between the upper terminal portion of the post and said head structure, a tubular standard slidably mounted on, lengthwise adjustable with respect to and projecting from the lower end of the post, a hand grip coupled with and spaced from the upper end of the standard, said post passing through said hand grip, a spring controlled clutching lever coacting with the post for latching the standard in extended relation with respect to the post, said lever being arranged between the hand grip and the upper end of the standard, means at the upper end of the standard providing a fulcrum for one end of said lever, and a slidable hinge connection between the lower terminal portion of the standard and said foot structure.

2. In a lengthwise adjustable supporting strut for trailer bodies, a head structure adapted to be fixed to the trailer body, a foot structure for mounting on the ground, a supporting post, a slidable hinged connection between the upper terminal portion of the post and said head structure, a tubular standard slidably mounted on, lengthwise adjustable with respect to and projecting from the lower end of the post, a hand grip coupled with and spaced from the upper end of the standard, said post passing through a said hand grip, a spring controlled clutching lever coacting with the post for latching the standard in extended relation with respect to the post, said lever being arranged between the hand grip and the upper end of the standard, and means at the upper end of the standard providing a fulcrum for one end of said lever, the said hand grip being coupled with the standard by a pair of oppositely disposed arms integral with the upper end of the standard and said grip and offset with respect to the standard, said fulcrum forming means consisting of an air integral with and offset with respect to the upper end of the standard and disposed at right angles to said arms; and a slidable hinge connection between the lower terminal portion of the standard and said foot structure.

3. In a lengthwise adjustable supporting strut for trailer bodies, a head structure adapted to be fixed to the trailer body, a foot structure for mounting on the ground, a supporting post, a slidable hinged connection between the upper terminal portion of the post and said head structure, a tubular standard slidably mounted on, lengthwise adjustable with respect to and projecting from the lower end of the post, a hand grip coupled with and spaced from the upper end of the standard, said post passing through said hand grip, a spring controlled clutching lever coacting with the post for latching the standard in extended relation with respect to the post, said lever being arranged between the hand grip and the upper end of the standard, means at the upper end of the standard providing a fulcrum for one end of said lever, and means adapted to be fixed to the bottom of the trailer for latching the standard and post in parallel relation to said bottom for retaining the strut in inactive position, and a slidable hinge connection between the lower terminal portion of the standard and said foot structure.

4. A lengthwise adjustable supporting strut for and adapted to be slidably hinged to the bottom of a trailer, said strut including a supporting post, a tubular standard slidably mounted on, adjustable relative to and capable of being extended from the lower end of said post, a pair of arms integral at one end with and diametrically opposed with respect to the upper end of the standard, a hand grip integral, intermediate its ends, with the other ends of said arms and encompassing said post, a spring controlled clutching lever coacting with said post for releasably maintaining said standard in extended relation with respect to the post, said lever being arranged between the upper end of the standard and said hand grip, disposed between said arms and encompassing said post, an arm integral with the upper end of the standard, arranged below one end of said lever and constituting a fulcrum for the latter, and a slidable hinge connection between the lower terminal portion of the standard and said foot structure.

5. A lengthwise adjustable supporting strut for and adapted to be slidably hinged to the bottom of a trailer, said strut including a supporting post, a tubular standard slidably mounted on, adjustable relative to and capable of being extended from the lower end of said post, a pair of arms integral at one end with and diametrically opposed with respect to the upper end of the standard, a hand grip integral, intermediate its ends, with the other ends of said arms and encompassing said post, a spring controlled clutching lever coacting with said post for releasably maintaining said standard in extended relation with respect to the post, said lever being arranged between the upper end of the standard and said hand grip, disposed between said arms and encompassing said post, and an arm integral with the upper end of the standard, arranged below one end of said lever and constituting a fulcrum for the latter, said post being disposed between the corresponding ends of the said hand grip and lever, the controlling spring for the lever being arranged between the latter and the hand grip, and a foot structure connected to the standard.

PERCY A. SKINNER.